United States Patent
Lee et al.

(10) Patent No.: US 7,389,590 B2
(45) Date of Patent: Jun. 24, 2008

(54) GEOMAGNETIC SENSOR FOR COMPUTING AZIMUTH AND METHOD THEREOF

(75) Inventors: Woo-Jong Lee, Suwon-si (KR); Sang-on Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 70 days.

(21) Appl. No.: 11/481,069

(22) Filed: Jul. 6, 2006

(65) Prior Publication Data
US 2007/0119061 A1    May 31, 2007

(30) Foreign Application Priority Data
Nov. 25, 2005    (KR)    ............... 10-2005-0113465

(51) Int. Cl.
*G01C 17/28*    (2006.01)
*G01R 33/02*    (2006.01)

(52) U.S. Cl. ............................. 33/356; 702/92
(58) Field of Classification Search ............... 33/355 R, 33/356, 357, 361, 362; 702/92, 93
See application file for complete search history.

(56) References Cited

U.S. PATENT DOCUMENTS

| | | | | |
|---|---|---|---|---|
| 4,995,165 A | * | 2/1991 | Daniels | 33/361 |
| 6,606,799 B2 | * | 8/2003 | Kato | 33/356 |
| 7,086,164 B2 | * | 8/2006 | Satoh et al. | 33/316 |
| 7,200,948 B2 | * | 4/2007 | Lee et al. | 33/356 |
| 7,295,943 B2 | * | 11/2007 | Cho et al. | 702/95 |
| 2004/0187328 A1 | * | 9/2004 | Satoh et al. | 33/356 |

FOREIGN PATENT DOCUMENTS

| | | | |
|---|---|---|---|
| EP | 1553384 A2 | * | 7/2005 |
| EP | 1790942 A1 | * | 5/2007 |
| JP | 2007147609 A | * | 6/2007 |

* cited by examiner

*Primary Examiner*—R. A. Smith
(74) *Attorney, Agent, or Firm*—Staas & Halsey LLP

(57) ABSTRACT

A geomagnetic sensor for computing an azimuth and a method thereof. The geomagnetic sensor includes a geomagnetic sensor module, including X, Y and Z axis fluxgates orthogonal to one another, for performing normalization for mapping output values of the X, Y and Z axis fluxgates onto a previously set normalization range using previously set normalization factors, an operation module for performing operation of new normalization factors based on a plurality of normalization values output from the geomagnetic sensor module when the geomagnetic sensor is swung within a previously set range, a tilt sensor module for computing a pitch angle and a roll angle, and a control module for providing the new normalization factors to the geomagnetic sensor module to allow the geomagnetic sensor module to perform renormalization and computing an azimuth using the output values renormalized by the geomagnetic sensor module and the pitch and roll angles computed during the renormalization. Therefore, it is possible to easily compute the normalization factors used for azimuth compensation.

24 Claims, 5 Drawing Sheets

GEOMAGNETIC SENSOR FOR COMPUTING AZIMUTH AND METHOD THEREOF

CROSS-REFERENCE TO RELATED APPLICATIONS

This application claims benefit under 35 U.S.C. § 119 from Korean Patent Application No. 2005-113465, filed on Nov. 25, 2005, in the Korean Intellectual Property Office, the disclosure of which is incorporated herein by reference.

BACKGROUND OF THE INVENTION

1. Field of the Invention

The present invention relates to a geomagnetic sensor for computing an azimuth and a method thereof, and more particularly, to a geomagnetic sensor for compensating an azimuth and a method thereof, in which normalization factors are simply computed for compensation of the azimuth 2. Description of the Related Art A geomagnetic sensor serves to sense the intensity of geomagnetism and its direction, which cannot be sensed by a human being. Particularly, a sensor that senses the geomagnetism using a fluxgate is called a fluxgate type geomagnetic sensor.

The fluxgate type geomagnetic sensor uses a material having high magnetic permeability, such as permalloy, as a magnetic core. The fluxgate type geomagnetic sensor generates an excited magnetic field through a driving coil that winds the magnetic core, and senses the size and the direction of an external magnetic field by sensing secondary high frequency components in proportion to the external magnetic field generated by magnetic saturation of the magnetic core and nonlinear magnetic characteristics.

Recently, with the increasing development of the micro electro mechanical system (MEMS) technology, it has come that a micromini fluxgate sensor of low power consumption can be fabricated using the MEMS technology and is used in cellular phones, PDAs, notebook computers, and various portable electronic devices.

Meanwhile, the geomagnetic sensor generally uses a two-axis or three-axis fluxgate. If the geomagnetic sensor is tilted when an azimuth is sensed using the geomagnetic sensor, the azimuth may be computed in error. To avoid such an error, an algorithm is generally performed, which compensates an azimuth using a tilt angle, i.e., a pitch angle or a roll angle. In a conventional geomagnetic sensor, operation of the pitch angle or the roll angle is performed using a two-axis acceleration sensor to compensate the azimuth.

The azimuth compensation work means that the azimuth is prevented from being distorted by the pitch angle or the roll angle. To perform the azimuth compensation work in a geomagnetic sensor provided with X, Y, and Z axis fluxgates, preparatory works are required. In other words, a maximum value and a minimum value from output values of the X and Z axis fluxgates are obtained as the output values of the X and Z axis fluxgates are monitored while the geomagnetic sensor is being swung at least one or more times around the Y axis. Then, operation of normalization factors is performed using the maximum value and the minimum value. The normalization factors mean those used for normalization that maps the output values of the X, Y and Z fluxgates onto values within a previously set range. Specifically, scale and offset values are used as the normalization factors.

If operation of the scale and offset values of the X and Z axes is performed, the operated values are stored in a memory of the geomagnetic sensor. Afterwards, a maximum value and a minimum value from output values of Y and Z axis fluxgates are obtained as the output values of the Y and Z axis fluxgates are monitored while the geomagnetic sensor is being swung at least one or more times around the X axis. Then, operation of normalization factors is performed using the maximum value and the minimum value.

The aforementioned conventional geomagnetic sensor has a problem in that the geomagnetic sensor is swung in various directions several times to perform the azimuth compensation work. For this reason, it is difficult to facilitate the azimuth compensation work.

SUMMARY OF THE INVENTION

Additional aspects and/or advantages of the invention will be set forth in part in the description which follows and, in part, will be apparent from the description, or may be learned by practice of the invention.

The present invention has been developed in order to solve the above drawbacks and other problems associated with the conventional arrangement. An aspect of the present invention is to provide a geomagnetic sensor for compensating an azimuth and a method thereof, in which normalization factors are computed through a simple swing operation to allow a user to facilitate compensation of the azimuth.

In order to achieve the above-described aspects of the present invention, there is provided a geomagnetic sensor which includes a geomagnetic sensor module, including X, Y and Z axis fluxgates orthogonal to one another, for performing normalization for mapping output values of the X, Y and Z axis fluxgates onto a previously set normalization range using previously set normalization factors; an operation module for performing an operation of new normalization factors based on a plurality of normalization values output from the geomagnetic sensor module when the geomagnetic sensor is swung within a previously set range, a tilt sensor module for computing a pitch angle and a roll angle, and a control module for providing the new normalization factors to the geomagnetic sensor module to allow the geomagnetic sensor module to perform renormalization and computing an azimuth using the output values renormalized by the geomagnetic sensor module and the pitch and roll angles computed during the renormalization.

The geomagnetic sensor module performs the normalization using a predetermined equation.

The operation module may compute new normalization factors for the X and Y axis fluxgates using the normalization values output from the geomagnetic sensor module while the geomagnetic sensor is swung around the Z axis fluxgate within the previously set range, and computes new normalization factors for the Z axis fluxgate using the normalization values output from the geomagnetic sensor module while the geomagnetic sensor is swung around the Y axis fluxgate within the previously set range.

Further, the operation module may compute new normalization factors for the X and Y axis fluxgates by sequentially performing a coordinate transform operation for the normalization values, an integer transform operation for the coordinate transformed values, and a normalization factor computing operation based on the transformed values.

In this case, the operation module performs the coordinate transform operation and the integer transform operation using a predetermined equation.

If the integer transform operation is completed, the operation module computes an intersection point between concentric circles around resultant values of the integer transform operation and determines X and Y coordinates of the intersection point as offset values of the X and Y fluxgates.

The operation module may perform an operation of new normalization factors for the Z axis fluxgate by sequentially performing a first operation for computing a plurality of data sets including the normalization values of the X and Y axis fluxgates output from the geomagnetic sensor module while the geomagnetic sensor is swung around the Y axis fluxgate within a previously set range, the output values of the Z axis fluxgate, the pitch angle, and the roll angle, a second operation for computing a plurality of normalization values of the Z axis fluxgate using a basic azimuth previously sensed in a horizontal direction and the plurality of data sets, and a third operation for computing scale and offset values of the Z axis using the normalization values of the Z axis and the output values of the Z axis fluxgate.

In this case, the operation module performs the second operation using a predetermined equation.

Furthermore, the operation module performs the third operation in order to compute a solution of a plurality of simultaneous equations obtained by substituting the normalization values of the Z axis fluxgate and the output values of the Z axis fluxgate for a predetermined equation.

Further, the operation module may compute an average value of the scale values of the Z axis and an average value of the offset values of the Z axis to determine the computed average values as the final scale and offset values of the Z axis fluxgate if a plurality of scale and offset values of the Z axis are computed through the third operation.

Furthermore, the control module computes the azimuth by substituting the output values renormalized by the geomagnetic sensor module, the pitch angle and the roll angle for a predetermined equation.

In another aspect of the present invention, there is provided a method for computing an azimuth of a geomagnetic sensor including X, Y and Z axis fluxgates orthogonal to one another, which includes computing a plurality of output values of the X, Y and Z axis fluxgates while the geomagnetic sensor is swung within a previously set range, computing a plurality of normalization values by performing normalization for mapping the output values of the X, Y and Z axis fluxgates onto a previously set normalization range using previously set normalization factors, computing a pitch angle and a roll angle when the output values of the X, Y and Z axis fluxgates are computed while the geomagnetic sensor is swung, computing new normalization factors using the normalization values, the pitch angle and the roll angle, renormalizing the output values of the X, Y and Z axis fluxgates using the new normalization factors in a state that the geomagnetic sensor is fixedly set, and computing the azimuth using the renormalized output values and the pitch and roll angles in a state that the geomagnetic sensor is fixedly set.

The normalization is performed using a predetermined normalization equation.

Computing new normalization factors may include computing new normalization factors for the X and Y axis fluxgates using the normalization values computed while the geomagnetic sensor is swung around the Z axis fluxgate within the previously set range, and computing new normalization factors for the Z axis fluxgate using the normalization values computed while the geomagnetic sensor is swung around the Y axis fluxgate within the previously set range.

Further, computing new normalization factors for the X and Y axis fluxgates includes performing a coordinate transform operation for the normalization values, performing an integer transform operation for the coordinate transformed values, and performing a normalization factor computing operation for the X and Y fluxgates based on the transformed values.

Meanwhile, the coordinate transform operation and the integer transform operation are performed using a predetermined equation for coordinate transform operation and a predetermined equation for integer transform operation.

Further, the normalization factor computing operation is performed by computing an intersection point between concentric circles around resultant values of the integer transform operation and determining X and Y coordinates of the intersection point as offset values of the X and Y fluxgates.

Furthermore, computing new normalization factors for the Z axis fluxgate includes computing a plurality of data sets including the normalization values of the X and Y axis fluxgates output from the geomagnetic sensor module while the geomagnetic sensor is swung around the Y axis fluxgate within the previously set range, the output values of the Z axis fluxgate, the pitch angle, and the roll angle, computing a plurality of normalization values of the Z axis fluxgate using a basic azimuth previously sensed in a horizontal direction and the plurality of data sets, and computing scale and offset values of the Z axis using the normalization values of the Z axis and the output values of the Z axis fluxgate.

Meanwhile, the normalization values of the Z axis fluxgate are computed by substituting the basic azimuth previously sensed in the horizontal direction and values stored in the data sets for a predetermined equation.

Furthermore, the offset and scale values of the Z axis fluxgate are computed by computing a solution of a plurality of simultaneous equations obtained by substituting the normalization values of the Z axis fluxgate and the output values of the Z axis fluxgate for a predetermined equation.

Further, computing new normalization factors for the Z axis fluxgate includes computing an average value of the scale values of the Z axis and an average value of the offset values of the Z axis to determine the computed average values as final scale and offset values of the Z axis fluxgate if a plurality of scale and offset values of the Z axis are computed.

Computing the azimuth includes substituting the renormalized output values and the pitch and roll angles in a state that the geomagnetic sensor is fixedly set for a predetermined equation.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
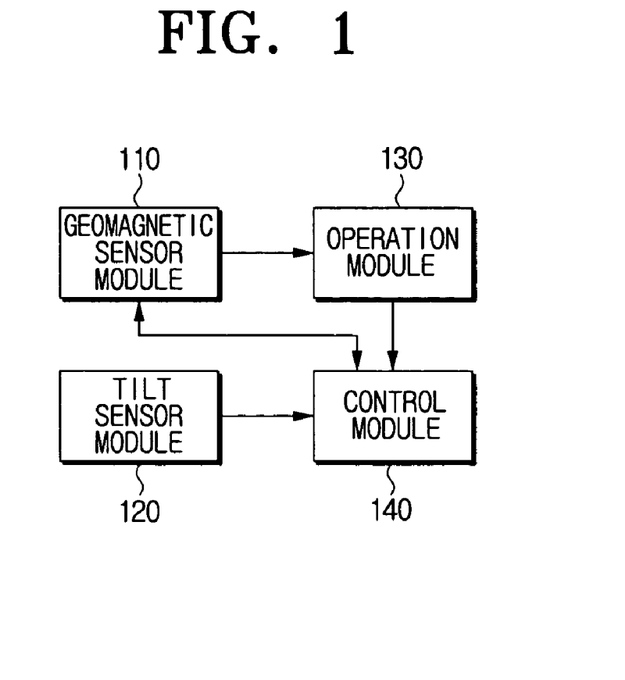
FIG. 1 is a block diagram illustrating a geomagnetic sensor according to an embodiment of the present invention.

FIG. 1 is a block diagram illustrating a geomagnetic sensor according to an embodiment of the present invention.

The geomagnetic sensor shown in FIG. 1 includes a geomagnetic sensor module 110, a tilt sensor module 120, an operation module 130, and a control module 140.

The geomagnetic sensor module 110 serves to output an electrical signal having a size corresponding to the geomagnetism. Specifically, the geomagnetic sensor module 110 may include X, Y and Z axis fluxgates orthogonal to one another. In this case, the geomagnetic sensor module 110 applies the electrical signal to each axis fluxgate to obtain an output value corresponding to the geomagnetism. The geomagnetic sensor module 110 can perform normalization for mapping each output value from the X, Y, and Z axis fluxgates within a previously set range. At this time, normalization factors such as offset values and scale values are used for normalization.

Figure 2:
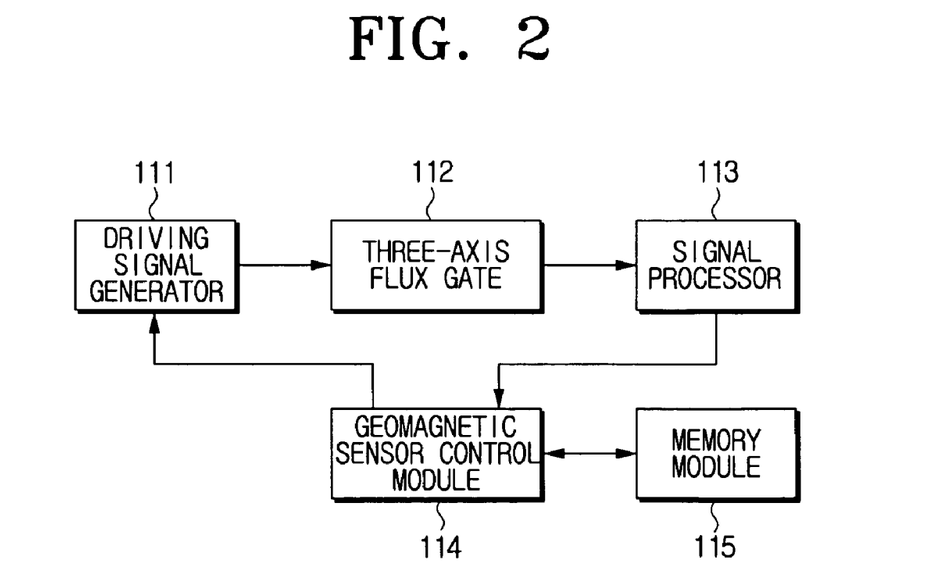
FIG. 2 is a block diagram illustrating a geomagnetic sensor module used in the geomagnetic sensor of FIG. 1.

FIG. 2 is a block diagram illustrating one example of the geomagnetic sensor module 110 used in the geomagnetic sensor of FIG. 1. Referring to FIG. 2, the geomagnetic sensor module 110 includes a driving signal generator 111, a three-axis fluxgate 112, a signal processor 113, a geomagnetic sensor control module 114, and a memory module 115.

The driving signal generator 111 generates a driving signal such as pulse and reverse pulse to provide the generated driving signal to the three-axis fluxgate 112.

The three-axis fluxgate 112 is driven by the driving signal to output a voltage value corresponding to the geomagnetism. The three-axis fluxgate 112 includes an X axis fluxgate arranged toward a front end of the geomagnetic sensor 100, a Y axis fluxgate arranged in a vertical direction with respect to the X axis fluxgate on a plane where the geomagnetic sensor 100 is arranged, and a Z axis fluxgate arranged in a vertical direction with respect to the X and Y axis fluxgates.

The signal processor 113 converts the output value output from the three-axis fluxgate 112 into a digital voltage value and outputs the digital voltage value.

The geomagnetic sensor control module 114 performs normalization for mapping each output value provided from the signal processor 113 onto a value within a previously set range. At this time, the normalization range can optionally be set. Specifically, the normalization range can be set between −1 and +1. The geomagnetic sensor control module 114 can perform normalization using Equation (1).

$$X_{norm} = \frac{X_{raw} - X_{offset}}{X_{scale}} \quad (1)$$

$$Y_{norm} = \frac{Y_{raw} - Y_{offset}}{Y_{scale}}$$

$$Z_{norm} = \frac{Z_{raw} - Z_{offset}}{Z_{scale}}$$

In Equation (1), $X_{norm}$, $Y_{norm}$, and $Z_{norm}$ respectively represent normalization values of the X, Y, and Z axis fluxgates, $X_{raw}$, $Y_{raw}$, and $Z_{raw}$ respectively represent digital output values of X, Y, Z axis fluxgates, $X_{offset}$, $Y_{offset}$, and $Z_{offset}$ respectively represent offset values of X, Y, Z axis fluxgates, and $X_{Scale}$, $Y_{Scale}$, $Z_{Scale}$ respectively represent scale values of X, Y, and Z axis fluxgates.

The offset values and the scale values are normalization factors used for normalization. Since the offset values and the scale values are previously set, values used for the azimuth compensation work can be used as the offset values and the scale values. To this end, the memory module 115 stores the previously set offset and scale values.

Meanwhile, if there are no previously set offset and scale values, i.e., if the azimuth compensation work is performed for the first time, the geomagnetic sensor is swung one time to compute the offset and scale values. Specifically, the offset and scale values can be computed using Equation (2).

$$X_{offset} = \frac{X_{max} + X_{min}}{2}, \quad X_{scale} = \frac{X_{max} - X_{min}}{2} \quad (2)$$

$$Y_{offset} = \frac{Y_{max} + Y_{min}}{2}, \quad Y_{scale} = \frac{Y_{max} - Y_{min}}{2}$$

$$Z_{offset} = \frac{Z_{max} + Z_{min}}{2}, \quad Z_{scale} = \frac{Z_{max} - Z_{min}}{2}$$

In Equation (2), $X_{max}$, $Y_{max}$, and $Z_{max}$ respectively represent maximum values of $X_{raw}$, $Y_{raw}$, and $Z_{raw}$, and $X_{min}$, $Y_{min}$, and $Z_{min}$ respectively represent minimum values of $X_{raw}$, $Y_{raw}$, and $Z_{raw}$. A manufacturer of the geomagnetic sensor according to the present invention senses $X_{max}$, $Y_{max}$, $Z_{max}$, $X_{min}$, $Y_{min}$, and $Z_{min}$ while rotating the geomagnetic sensor several times. The manufacturer of the geomagnetic sensor can perform initial operation of the offset values and the scale values by substituting the sensed values for Equation (2) and store the resultant offset and scale values in the memory module 115. Thus, the offset and scale values stored in the memory module 115 are used as the normalization factors for normalization during the azimuth compensation work.

Referring to FIG. 1 again, the tilt sensor module 120 serves to compute a pitch value and a roll angle. Specifically, the tilt sensor module 120 can compute the pitch value and the roll angle using a two-axis acceleration sensor or a three-axis acceleration sensor.

For example, if the two-axis acceleration sensor is used, the tilt sensor module 120 includes X and Y axis acceleration sensors (not shown) orthogonal to each other. In this case, the tilt sensor module 120 normalizes output values of the X and Y axis acceleration sensors using Equation (3) below and then performs operation of the pitch angle and the roll angle using the normalized values.

$$Xt_{norm} = \frac{Xt - Xt_{offset}}{Xt_{scale}} \quad (3)$$

$$Yt_{norm} = \frac{Yt - Yt_{offset}}{Yt_{scale}}$$

$$Xt_{offset} = \frac{Xt_{max} + Xt_{min}}{2}, \quad Xt_{scale} = \frac{Xt_{max} - Xt_{min}}{2}$$

$$Yt_{offset} = \frac{Yt_{max} + Yt_{min}}{2}, \quad Yt_{scale} = \frac{Yt_{max} - Yt_{min}}{2}$$

In Equation (3), Xt and Yt respectively represent output values of the X and Y axis acceleration sensors, $Xt_{norm}$ and $Yt_{norm}$ respectively represent normalization values of the X and Y axis acceleration sensors, $Xt_{max}$ and $Xt_{min}$ respectively represent a maximum value and a minimum value of Xt, $Yt_{max}$ and $Yt_{min}$ respectively represent a maximum value and a minimum value of Yt, $Xt_{offset}$ and $Yt_{offset}$ respectively represent offset values of the X and Y axis acceleration sensors, $Xt_{Scale}$ and $Yt_{Scale}$ respectively represent scale values of the X and Y axis acceleration sensors. In the same manner as the geomagnetic sensor module 110, $Xt_{offset}$, $Yt_{offset}$, $Xt_{Scale}$, $Yt_{Scale}$ are previously stored in a memory module inside the tilt sensor module 120 and thus can be used as the offset and scale values.

The tilt sensor module 120 can perform operation of the pitch angle and the roll angle using Equation (4).

$$\theta = \sin^{-1}(Xt_{norm}) \quad (4)$$

$$\phi = \sin^{-1}\left(\frac{Yt_{norm}}{\cos\theta}\right)$$

In Equation (4), $\theta$ represents the pitch angle, and $\phi$ represents the roll angle.

The operation module 130 serves to compute new normalization factors using the normalization values obtained by the geomagnetic sensor module 110.

The control module 140 provides the new normalization factors to the geomagnetic sensor module 110 to perform renormalization using the new normalization factors. Thus, if the renormalized values are output, the control module 140 computes the azimuth using the pitch angle and the roll angle obtained by the tilt sensor module 120 and the renormalized values.

Hereinafter, the operation of the geomagnetic sensor according to an embodiment of the present invention will be described in detail.

Figure 3:
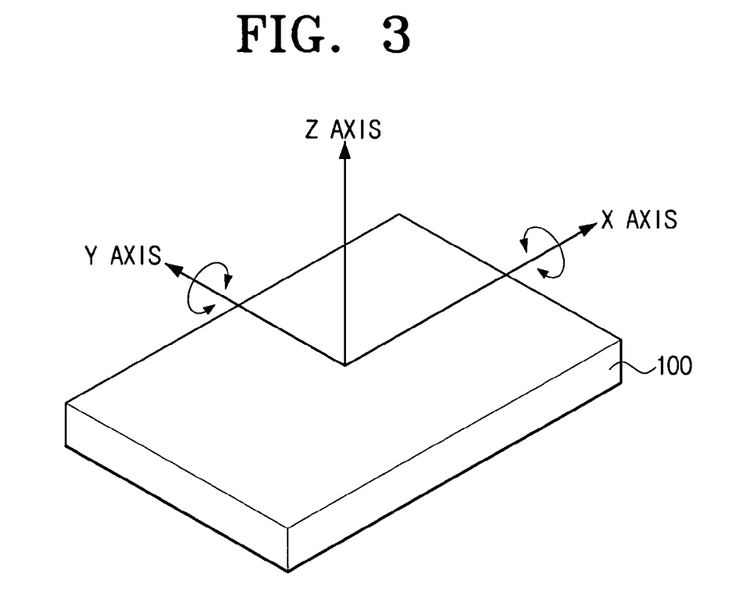
FIG. 3 is a diagram illustrating one example of axial arrangement of the geomagnetic sensor of FIG. 1.

FIG. 3 is a diagram illustrating one example of axial arrangement of the X, Y, and Z axis fluxgates on the geomagnetic sensor 100. As shown in FIG. 3, the X axis fluxgate is arranged toward the front end of the geomagnetic sensor 100, the Y axis fluxgate is arranged in a perpendicular direction with respect to the X axis fluxgate, and the Z axis fluxgate is arranged in a pendicular direction with respect to the plane where the X and Y axis fluxgates are arranged.

In this state, to compute the azimuth whose tilt is compensated, it is necessary to newly set the normalization factors. In this case, the normalization factors for the X and Y axis fluxgates are computed separately from the normalization factors for the Z axis fluxgate.

First, to compute the normalization factors for the X and Y axis normalization factors, the geomagnetic sensor 100 is swung around the Z axis fluxgate. The swing range may be in the range of 90° to 180° unlike the conventional swing range of 360° or greater.

The geomagnetic sensor module 110 computes a plurality of normalization values during the swing operation. The normalization values can be computed using Equation (1) as described above. The geomagnetic sensor module 110 can compute the normalization values per a predetermined period based on the swing angle. That is, if the swing angle is set at 5°, the normalization values are computed whenever the geomagnetic sensor is swung at 5°. Then, the computed normalization values are provided to the operation module 130. Alternatively, the normalization values may be computed per a predetermined period based on time. That is, if one second is set as the period for computing the normalization values, the normalization values are computed whenever one second passes. Then, the computed normalization values are provided to the operation module 130. The operation module 130 newly computes the normalization factors for the X, Y and Z axis fluxgates using the plurality of normalization values. First, to compute the normalization factors for the X and Y axis fluxgates, the operation module 130 sequentially performs coordinate transform operation, integer transform operation, and operation for computing X and Y axis normalization factors. Here, 5° and one second are not critical but merely exemplified.

The coordinate transform operation means that the output value of the three-axis fluxgate 112 is projected on a two-dimensional horizontal plane and then is converted into X and Y axis coordinate values. The coordinate conversion operation can specifically be performed using Equation (5).

$$X_{horizontal} = X_{norm}*\cos\theta - Y_{norm}*\sin\theta*\sin\phi - Z_{norm}*\sin\theta*\cos\phi$$

$$Y_{horizontal} = Y_{norm}*\cos\phi - Z_{norm}*\sin\phi \quad (5)$$

In Equation (5), $X_{norm}$, $Y_{norm}$, and $Z_{norm}$ respectively represent the normalization values of the X, Y, and Z axis fluxgates, $X_{horizontal}$ and $Y_{horizontal}$ respectively represent coordinate transform values of the output values of the X and Y axis fluxgates, $\theta$ represents the pitch angle, and $\phi$ represents the roll angle. In this case, the pitch angle and the roll angle are those computed by the tilt sensor module 120 at the time when the output values of the X, Y, and Z axis fluxgates are computed.

The X and Y axis coordinate values computed by Equation (5) are normalized decimal values. Therefore, the X and Y axis coordinate values are transformed into integer values through the integer transform operation. The integer transform operation for obtaining the offset values is as in Equation (6).

$$X_{new} = (X_{horizontal}*X_{scale}) + X_{offset}$$

$$Y_{new} = (Y_{horizontal}*Y_{scale}) + Y_{offset} \quad (6)$$

In Equation (6), $X_{new}$ and $Y_{new}$ represent resultant values of the integer transform operation. For example, if $X_{horizontal}$ is equal to 0.7 corresponding to a decimal value, $X_{scale}$ and $X_{offset}$ are previously set at 600 and 2000, respectively. In such case, $X_{new}$ is computed as an integer value such as 2420.

Meanwhile, since the plurality of normalization values are computed, a plurality of integer values $X_{new}$ and $Y_{new}$ are also obtained. Therefore, X and Y coordinates of an intersection point between respective concentric circles around the integer values $X_{new}$ and $Y_{new}$ are determined as final offset values of the X and Y axes.

Figure 4:
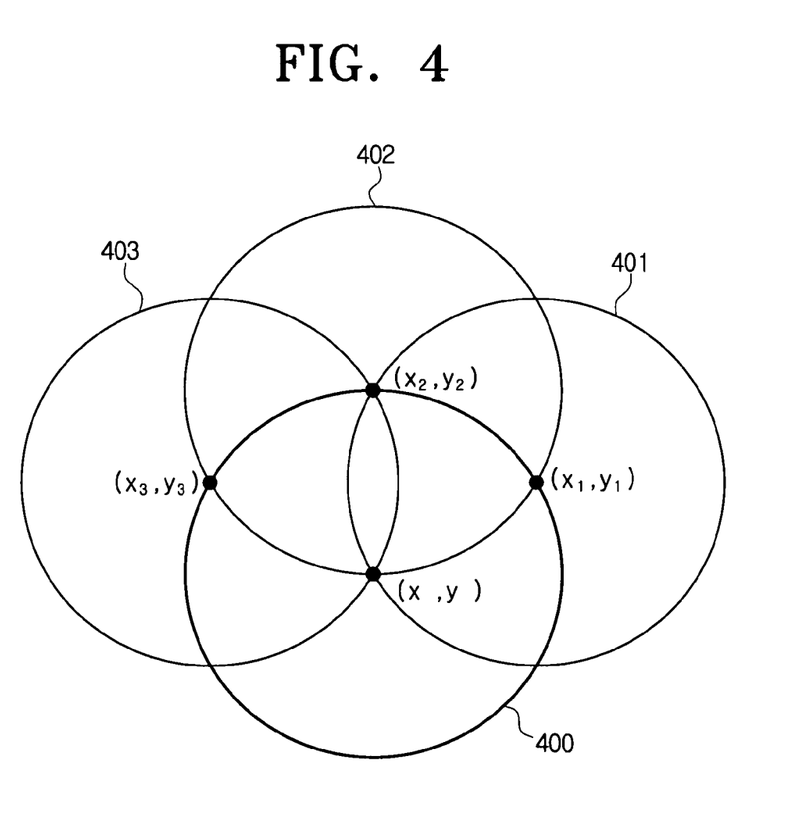
FIG. 4 is a diagram illustrating the operation procedure of normalization factors in accordance with the geomagnetic sensor of FIG. 1.

FIG. 4 is a diagram illustrating the operation procedure of determining the offset values of the X and Y axes.

If three data sets of (x1, y1), (x2, y2), and (x3, y3) are obtained, a plurality of concentric circles 401, 402, and 403 respectively having central points (x1, y1), (x2, y2), and (x3, y3) are drawn. In this case, the concentric circles cross one another at (x, y). When a circle 400 having the same radius around (x, y) is drawn, (x1, y1), (x2, y2), and (x3, y3) are positioned on the circumference of the circle 400. This is expressed by Equation (7).

$$(x-x1)^2 + (y-y1)^2 = r1^2$$

$$(x-x2)^2 + (y-y2)^2 = r2^2$$

$$(x-x3)^2 + (y-y3)^2 = r3^2 \quad (7)$$

In Equation (7), simultaneous equations are solved to perform operation of (x, y) supposing that r1=r2=r3. In the operation values, the X coordinate becomes the offset value of the X axis while the Y coordinate becomes the offset value of the Y axis.

Meanwhile, since there is no great difference between the scale value of the X axis and the scale value of the Y axis, the scale values of the normalization factors are little different from the existing scale values. Therefore, an error due to the difference between the scale values may be discarded during the azimuth compensation work. In this regard, it is preferable to newly control the offset values without newly controlling the scale values.

Next, the procedure of computing the normalization factors for the Z axis fluxgate will be described. To compute the Z axis fluxgate, the azimuth in a horizontal direction, i.e., the basic azimuth is first computed and then stored in a register inside the operation module 130 or a separate memory (not shown). Since the azimuth in a horizontal direction may be determined by the output values of the X and Y axis fluxgates, it can be computed regardless of the Z axis signal. Specifically, the basic azimuth can be computed using $\tan^{-1}$(Y axis output value/X axis output value). The procedure of computing the normalization factors for the Z axis fluxgate is based on the principle that the azimuth remains unchanged even if the geomagnetic sensor 100 is tilted.

As described above, to change the pitch angle, the geomagnetic sensor 100 is swung around the Y axis fluxgate while minimizing change of a yaw angle within the range previously set in a state that the basic azimuth is stored in the register or the memory. $X_{norm}$, $Y_{norm}$, $Z_{raw}$, $\theta$, and $\phi$ are computed while the pitch angle is computed. The data computed at the same time are stored as one data set. In this way, a plurality of data sets are provided. Specifically, the data sets can be provided as follows.

TABLE 1

| INDEX | $X_{norm}$ | $Y_{norm}$ | $Z_{raw}$ | $\theta$ | $\phi$ |
|---|---|---|---|---|---|
| 1 | 0.75 | 0.37 | 2048 | 0.05 | 0.01 |
| 2 | 0.72 | 0.37 | 2028 | 0.09 | 0.01 |
| 3 | 0.69 | 0.37 | 2008 | 0.13 | 0.01 |
| 4 | 0.66 | 0.37 | 1988 | 0.17 | 0.01 |
| 5 | 0.63 | 0.37 | 1968 | 0.21 | 0.01 |
| 6 | 0.60 | 0.37 | 1948 | 0.25 | 0.01 |
| 7 | 0.57 | 0.37 | 1928 | 0.29 | 0.01 |
| 8 | 0.54 | 0.37 | 1908 | 0.33 | 0.01 |
| 9 | 0.51 | 0.37 | 1888 | 0.37 | 0.01 |
| 10 | 0.48 | 0.37 | 1868 | 0.41 | 0.01 |

Referring to Table 1, the geomagnetic sensor is swung around the Y axis fluxgate while minimizing change of a yaw angle. Thus, it is noted that $Y_{norm}$ and $\phi$ are maintained at constant values. To enhance accuracy of operation, it is preferable to maintain $Y_{norm}$ and $\phi$ at the constant values as shown in Table 1.

Each of the data sets can be stored in the register inside the operation module 130 or the separate memory. In the present invention, the procedure of preparing and storing the data sets is referred to as first operation.

If the plurality of data sets are computed, the normalization values of the Z axis fluxgate are computed by substituting each data set in Equation (8).

$$Z_{norm} = \frac{(\cos\phi + \tan\psi_s \sin\theta \sin\phi)Y_{norm} - (\tan\psi_s \cos\theta)X_{norm}}{\sin\phi - \sin\theta\cos\phi\tan\psi_s} \quad (8)$$

In Equation (8), $\psi_s$ represents the basic azimuth. If each data set is substituted in Equation (8), a plurality of normalization values $Z_{norm}$ for the Z axis fluxgate are computed.

Next, the plurality of normalization values $Z_{norm}$ are substituted in Equation (9) to perform operation of the offset and scale values of the Z axis.

$$Z_{offset} + Z_{Scale} * Z_{norm} = Z_{raw} \quad (9)$$

In other words, if $Z_{raw}$ of the data sets used for operation of $Z_{norm}$ and $Z_{norm}$ operated using the data sets are simultaneously substituted in Equation (9), an equation having parameters $Z_{offset}$ and $Z_{Scale}$ is obtained. A plurality of output values $Z_{raw}$ and $Z_{norm}$ corresponding to these output values $Z_{raw}$ are substituted in Equation (9) to obtain a plurality of equations. The equations are together solved to compute $Z_{offset}$ and $Z_{Scale}$.

Meanwhile, if 10 data sets are computed, a plurality of offset values and scale values $Z_{offset}$ and $Z_{Scale}$ can be computed. In this case, an average value of the plurality of offset values $Z_{offset}$ and an average value of the plurality of scale values $Z_{Scale}$ are computed so that the computed values can finally be determined as $Z_{offset}$ and $Z_{Scale}$.

If $X_{offset}$, $Y_{offset}$, $Z_{offset}$ and $Z_{Scale}$ are obtained as above, the preparing procedure is completed. In this state, if the geomagnetic sensor 100 is fixedly set to sense the azimuth, the control module 140 provides the finally determined $X_{offset}$, $Y_{offset}$, $Z_{offset}$ and $Z_{Scale}$ to the geomagnetic sensor module 110 to perform normalization for the output values of the X, Y, and Z axis fluxgates. The geomagnetic sensor module 110 can perform normalization using Equation (1).

Furthermore, the tilt sensor module 120 computes the pitch angle and the roll angle in a state that the geomagnetic sensor 100 is fixedly set. Therefore, the control module 140 computes the azimuth using the normalization values normalized using new normalization factors and the pitch and roll angles in a state that the geomagnetic sensor 100 is fixedly set.

One example of an equation for computing the azimuth is as in Equation (10).

$$\psi = \tan^{-1}\left(\frac{Y_{norm} * \cos\phi - Z_{norm} * \sin\phi}{X_{norm} * \cos\theta - Y_{norm} * \sin\theta * \sin\phi - Z_{norm} * \sin\theta * \cos\phi}\right) \quad (10)$$

In Equation (10), $\psi$ represents the azimuth, $X_{norm}$, $Y_{norm}$, and $Z_{norm}$ respectively represent renormalization values of the X, Y, and Z axis fluxgates, $\theta$ represents the pitch angle, and $\phi$ represents the roll angle.

Figure 5:
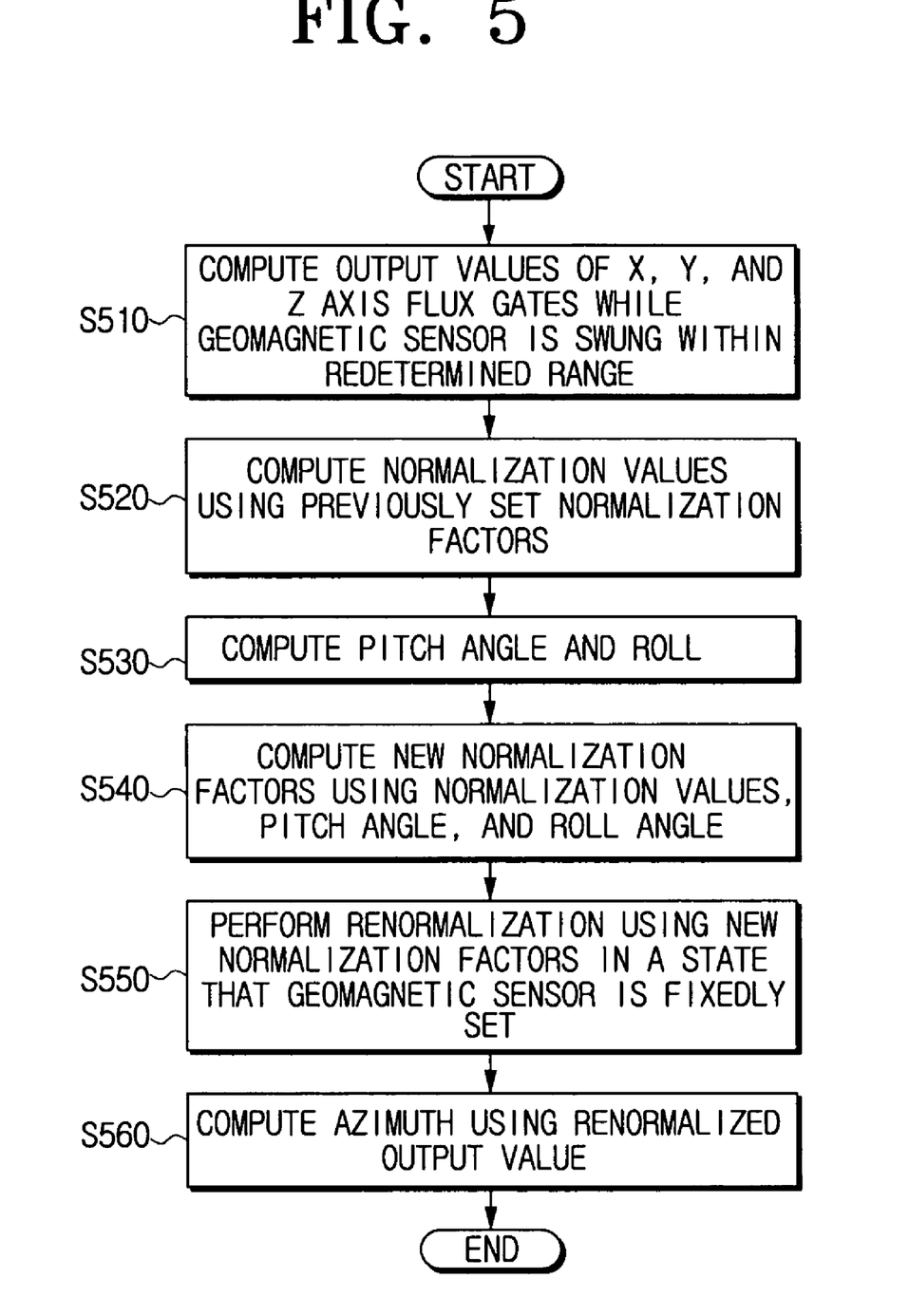
FIG. 5 is a flowchart illustrating a method for computing an azimuth in accordance with an embodiment of the present invention.

FIG. 5 is a flowchart illustrating a method for computing the azimuth in accordance with the preferred embodiment of the present invention. Referring to FIG. 5, in the method for computing the azimuth according to the preferred embodiment, the output values of the X, Y, and Z axis fluxgates are computed while the geomagnetic sensor 100 is swung within the previously set range (S510). Specifically, the output values of the X, Y, and Z axis fluxgates are computed within the previously set range while the geomagnetic sensor 100 is swung around the Z axis fluxgate in the range of 90° to 180° and also is upward or downward swung around the Y axis fluxgate in the range of 90°.

Then, normalization is performed using the previously set normalization factors, i.e., the offset values and the scale values (S520). The normalization may be performed through Equation (1).

Meanwhile, the pitch angle and the roll angle are computed whenever the output values of the X, Y, and Z axis fluxgates are computed (S530).

The new normalization factors for the X, Y, and Z axis fluxgates are computed using the normalization values of the X, Y, and Z axis fluxgates, the pitch angle, and the roll angle (S540). Specifically, the offset values of the X and Y axis fluxgates and the scale and offset values of the Z axis fluxgate can be computed.

Next, renormalization is performed using the new normalization factors in a state that the geomagnetic sensor is fixedly set. At this time, the pitch angle and the roll angle are computed (S550).

Then, the azimuth is computed using the computed renormalization values, the pitch angle, and the roll angle (S560). The azimuth can be computed using Equation (10).

Figure 6:
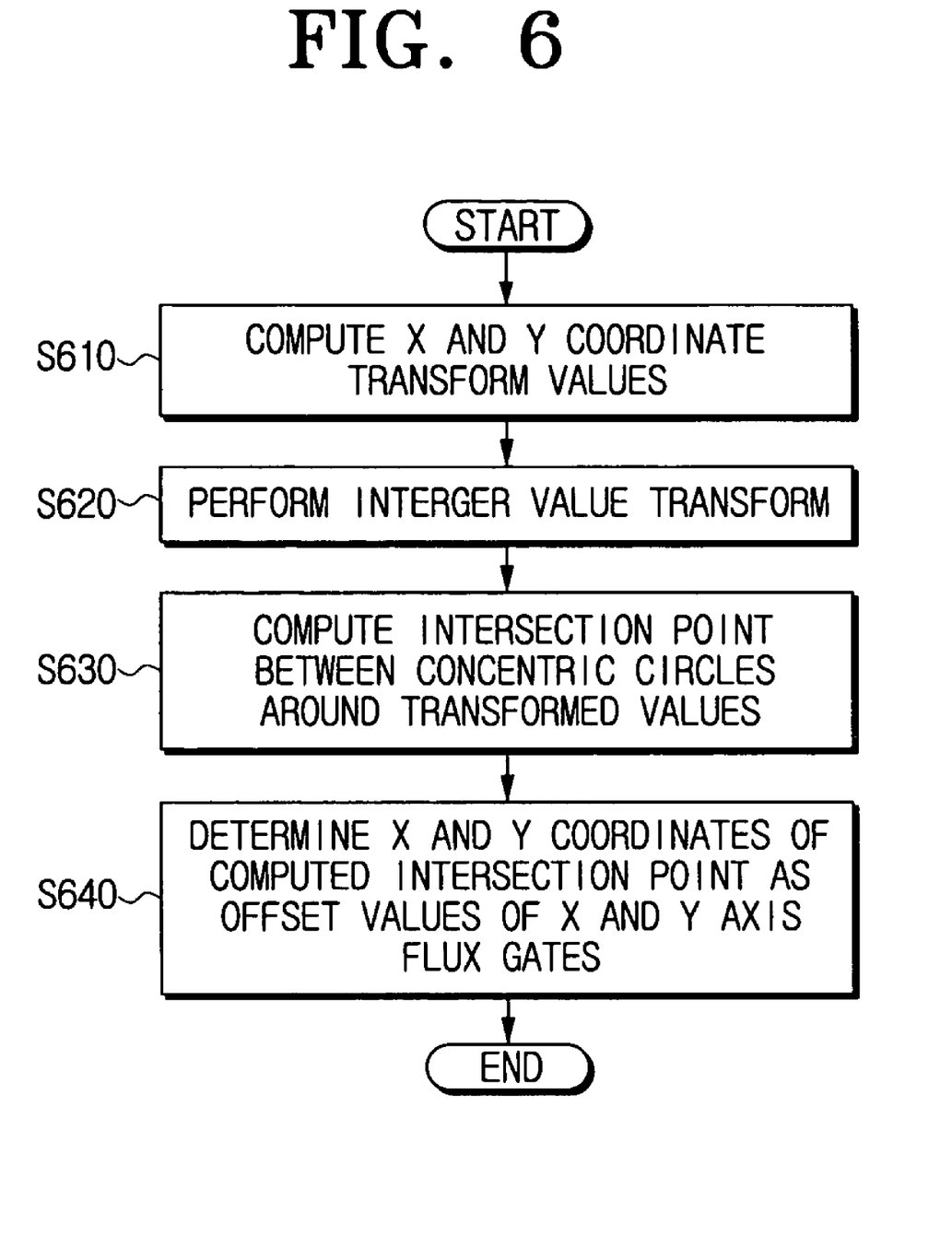
FIG. 6 is a flowchart illustrating an operation method of normalization factors of X and Y axis fluxgates in the method of FIG. 5.

FIG. 6 is a flowchart illustrating a method of computing the normalization factors of the X and Y axis fluxgates. Referring to FIG. 6, X and Y coordinate transform values are computed using the normalization values of the X, Y, and Z axis fluxgates (S610). The coordinate transform can be performed using Equation (5).

If the coordinate transform is performed, the coordinate transformed values are transformed into integer values (S620).

Integer value transform can be performed using Equation (6).

If the integer value transform is performed, the intersection point between the concentric circles around the transformed values is computed (S630). The intersection point can be computed using Equation (7).

Therefore, if the intersection point is computed, the X coordinate of the intersection point is finally determined as the offset value of the X axis and the Y coordinate of the intersection point is finally determined as the offset value of the Y axis (S640). Meanwhile, it is preferable that the previously set scale values are used.

Figure 7:
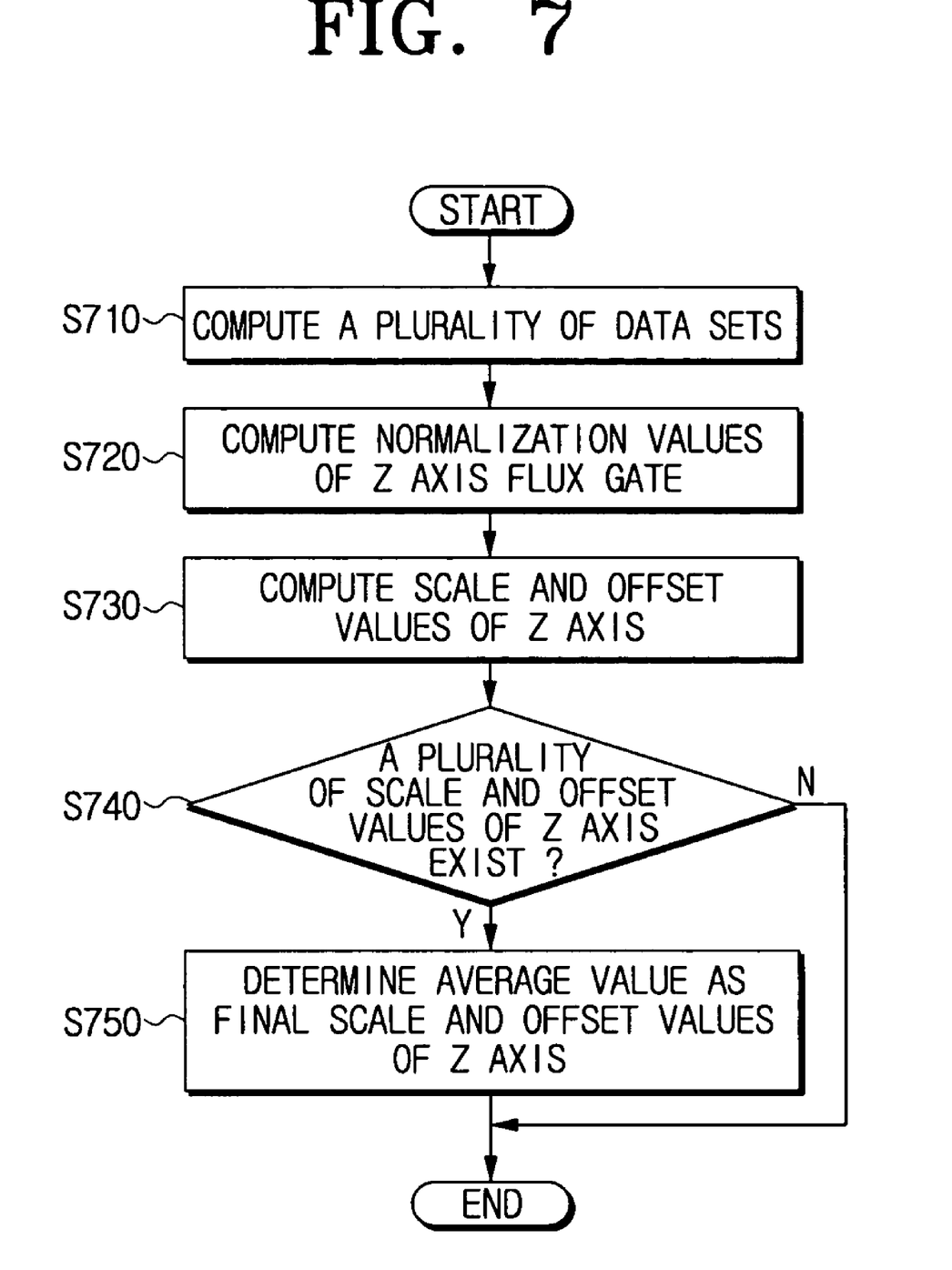
FIG. 7 is a flowchart illustrating an operation method of normalization factors of a Z axis fluxgate in the method of FIG. 5.

FIG. 7 is a flowchart illustrating a method of computing the normalization factors of the Z axis fluxgate. Referring to FIG. 7, the plurality of data sets are computed while the geomagnetic sensor 100 is swung around the Y axis fluxgate within the previously set range in a state that the basic azimuth is computed and stored (S710). $X_{norm}$, $Y_{norm}$, $Z_{raw}$, $\theta$, and $\phi$ are stored in each of the data sets.

The plurality normalization values of the Z axis fluxgate are computed using each data set (S720). The normalization values of the Z axis fluxgate can be computed using Equation (8).

Then, the scale and offset values of the Z axis fluxgate are computed based on the normalization values of the Z axis fluxgate and the data sets (S730). Specifically, the scale and offset values are computed in such a manner that simultaneous equations are obtained by substituting the normalization values of the Z axis fluxgate and the data sets for Equation (9) and their solutions are computed.

In this case, if the plurality of scale values and the plurality of offset values are computed (S740), their average values are computed to finally determine the scale and offset values of the Z axis (S750). In this way, the normalization factors for the X, Y, and Z axis fluxgates can exactly be computed.

As described above, in the geomagnetic sensor for compensating the azimuth and the method thereof according to an embodiment of the present invention, the normalization factors required to compensate the azimuth are computed through a simple swing operation. In this case, since the azimuth compensation work is simply performed, it is possible to improve convenience of the user. Also, since operation of the azimuth is performed using the computed normalization factors, it is possible to minimize an error of the azimuth.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A geomagnetic sensor for performing azimuth compensation work, comprising:
  a geomagnetic sensor module, including X, Y and Z axis fluxgates orthogonal to one another, for performing normalization for mapping output values of the X, Y and Z axis fluxgates onto a previously set normalization range using previously set normalization factors;
  an operation module for performing operation of new normalization factors based on a plurality of normalization values output from the geomagnetic sensor module while the geomagnetic sensor is swung within a previously set range;
  a tilt sensor module for computing a pitch angle and a roll angle; and
  a control module for providing the new normalization factors to the geomagnetic sensor module to allow the geomagnetic sensor module to perform renormalization and computing an azimuth using the output value renormalized by the geomagnetic sensor module and the pitch and roll angles computed during the renormalization.

2. The geomagnetic sensor as claimed in claim 1, wherein the geomagnetic sensor module performs the normalization using the following equation:

$$X_{norm} = \frac{X_{raw} - X_{offset}}{X_{scale}}$$

$$Y_{norm} = \frac{Y_{raw} - Y_{offset}}{Y_{scale}}$$

$$Z_{norm} = \frac{Z_{raw} - Z_{offset}}{Z_{scale}}$$

wherein $X_{norm}$, $Y_{norm}$, and $Z_{norm}$ respectively represent normalization values of the X, Y, and Z axis fluxgates, $X_{raw}$, $Y_{raw}$, and $Z_{raw}$ respectively represent digital output values of the X, Y, Z axis fluxgates, $X_{offset}$, $Y_{offset}$, and $Z_{offset}$ respectively represent offset values of the X, Y, Z axis fluxgates, and $X_{scale}$, $Y_{scale}$, $Z_{scale}$ respectively represent scale values of the X, Y, and Z axis fluxgates.

3. The geomagnetic sensor as claimed in claim 1, wherein the operation module computes new normalization factors for the X and Y axis fluxgates using the normalization values output from the geomagnetic sensor module while the geomagnetic sensor is swung around the Z axis fluxgate within the previously set range, and computes new normalization factors for the Z axis fluxgate using the normalization values output from the geomagnetic sensor module while the geomagnetic sensor is swung around the Y axis fluxgate within the previously set range.

4. The geomagnetic sensor as claimed in claim 3, wherein the operation module computes the new normalization factors for the X and Y axis fluxgates by sequentially performing coordinate transform operation for the normalization values, integer transform operation for the coordinate transformed values, and normalization factor computing operation based on the transformed values.

5. The geomagnetic sensor as claimed in claim 4, wherein the operation module performs the coordinate transform operation using the following equation:

$$X_{horizontal}=X_{norm}*\cos\theta-Y_{norm}*\sin\theta*\sin\phi-Z_{norm}*\sin\theta*\cos\phi$$

$$Y_{horizontal}=Y_{norm}*\cos\phi-Z_{norm}*\sin\phi$$

wherein $X_{norm}$, $Y_{norm}$, $Z_{norm}$ respectively represent the normalization values of the X, Y, and Z axis fluxgates, $X_{horizontal}$ and $Y_{horizontal}$ respectively represent coordinate transform values of the output values of the X and Y axis fluxgates, $\theta$ represents the pitch angle, and $\phi$ represents the roll angle.

6. The geomagnetic sensor as claimed in claim 4, wherein the operation module performs the integer transform operation using the following equation:

$$X_{new}=(X_{horizontal}*X_{scale})+X_{offset}$$

$$Y_{new}=(Y_{horizontal}*Y_{scale})+Y_{offset}$$

wherein $X_{new}$ and $Y_{new}$ respectively represent resultant values of the integer transform operation, $X_{horizontal}$ and $Y_{horizontal}$ respectively represent coordinate transform values of the output values of the X and Y fluxgates, $X_{offset}$ and $Y_{offset}$ respectively represent previously set offset values for the X and Y axis fluxgates, and $X_{scale}$ and $Y_{scale}$ respectively represent previously set scale values for the X and Y axis fluxgates.

7. The geomagnetic sensor as claimed in claim 4, wherein the operation module performs the normalization factor computing operation by computing an intersection point between concentric circles around resultant values of the integer transform operation and determining X and Y coordinates of the intersection point as offset values of the X and Y fluxgates.

8. The geomagnetic sensor as claimed in claim 3, wherein the operation module performs operation of the new normalization factors for the Z axis fluxgate by sequentially performing first operation for computing a plurality of data sets including the normalization values of the X and Y axis fluxgates output from the geomagnetic sensor module while the geomagnetic sensor is swung around the Y axis fluxgate within the previously set range, the output values of the Z axis fluxgate, the pitch angle, and the roll angle, second operation for computing a plurality of normalization values of the Z axis fluxgate using a basic azimuth previously sensed in a horizontal direction and the plurality of data sets, and third operation for computing scale and offset values of the Z axis using the normalization values of the Z axis and the output values of the Z axis fluxgate.

9. The geomagnetic sensor as claimed in claim 8, wherein the operation module performs the second operation using the following equation:

$$Z_{norm}=\frac{(\cos\phi+\tan\psi_s\sin\theta\sin\phi)Y_{norm}-(\tan\psi_s\cos\theta)X_{norm}}{\sin\phi-\sin\theta\cos\phi\tan\psi_s}$$

wherein $\psi_s$ represents the basic azimuth, $\theta$ represents the pitch angle, $\phi$ represents the roll angle, and $X_{norm}$ and $Y_{norm}$ respectively represent the normalization values of the X and Y axis fluxgates included in each of the data sets.

10. The geomagnetic sensor as claimed in claim 8, wherein the operation module performs the third operation in order to compute a solution of a plurality of simultaneous equations obtained by substituting the normalization values of the Z axis fluxgate and the output values of the Z axis fluxgate for a following equation:

$$Z_{offset}+Z_{scale}*Z_{norm}=Z_{raw}$$

wherein $Z_{offset}$ represents the offset values of the Z axis fluxgate, $Z_{scale}$ represents the scale values of the Z axis fluxgate, $Z_{raw}$ represents the output values of the Z axis fluxgate included in each of the data sets, and $Z_{norm}$ represents the normalization values of the Z axis fluxgate computed through the second operation.

11. The geomagnetic sensor as claimed in claim 8, wherein the operation module computes an average value of the scale values of the Z axis and an average value of the offset values of the Z axis to determine the computed average values as the final scale and offset values of the Z axis fluxgate if a plurality of scale and offset values of the Z axis are computed through the third operation.

12. The geomagnetic sensor as claimed in claim 1, wherein the control module computes the azimuth by substituting the output values renormalized by the geomagnetic sensor module, the pitch angle and the roll angle in the following equation:

$$\psi=\tan^{-1}\left(\frac{Y_{norm}*\cos\phi-Z_{norm}*\sin\phi}{X_{norm}*\cos\theta-Y_{norm}*\sin\theta*\sin\phi-Z_{norm}*\sin\theta*\cos\phi}\right)$$

wherein $\psi$ represents the azimuth, $X_{norm}$, $Y_{norm}$, and $Z_{norm}$ respectively represent the renormalization values of the X, Y, and Z axis fluxgates, $\theta$ represents the pitch angle, and $\phi$ represents the roll angle.

13. A method for computing an azimuth of a geomagnetic sensor including X, Y and Z axis fluxgates orthogonal to one another, the method comprising:

computing a plurality of output values of the X, Y and Z axis fluxgates when the geomagnetic sensor is swung within a previously set range;

computing a plurality of normalization values by performing normalization for mapping the output values of the X, Y and Z axis fluxgates onto a previously set normalization range using previously set normalization factors;

computing a pitch angle and a roll angle when the output values of the X, Y and Z axis fluxgates are computed while the geomagnetic sensor is swung;

computing new normalization factors using the normalization values, the pitch angle and the roll angle;

renormalizing the output values of the X, Y and Z axis fluxgates using the new normalization factors in a state that the geomagnetic sensor is fixedly set; and computing the azimuth angle using the renormalized output values and the pitch and roll angles in a state that the geomagnetic sensor is fixedly set.

14. The method as claimed in claim 13, wherein computing a plurality of normalization values includes performing the normalization using the following equation:

$$X_{norm}=\frac{X_{raw}-X_{offset}}{X_{scale}}$$

$$Y_{norm}=\frac{Y_{raw}-Y_{offset}}{Y_{scale}}$$

$$Z_{norm}=\frac{Z_{raw}-Z_{offset}}{Z_{scale}}$$

wherein $X_{norm}$, $Y_{norm}$, and $Z_{norm}$ respectively represent normalization values of the X, Y, and Z axis fluxgates, $X_{raw}$, $Y_{raw}$, and $Z_{raw}$ respectively represent digital output values of the X, Y, Z axis fluxgates, $X_{offset}$, $Y_{offset}$, and $Z_{offset}$ respectively represent offset values of the X, Y, Z axis fluxgates, and $X_{scale}$, $Y_{scale}$, $Z_{scale}$ respectively represent scale values of the X, Y, and Z axis fluxgates.

15. The method as claimed in claim 13, wherein computing new normalization factors comprises:

computing new normalization factors for the X and Y axis fluxgates using the normalization values computed while the geomagnetic sensor is swung around the Z axis fluxgate within the previously set range; and computing new normalization factors for the Z axis fluxgate using the normalization values computed while the geomagnetic sensor is swung around the Y axis fluxgate within the previously set range.

16. The method as claimed in claim 15, wherein computing new normalization factors for the X and Y axis fluxgates comprises:

performing a coordinate transform operation for the normalization values;

performing an integer transform operation for the coordinate transformed values; and performing a normalization factor computing operation for the X and Y fluxgates based on the transformed values.

17. The method as claimed in claim 16, wherein the coordinate transform operation is performed using the following equation:

$X_{horizontal} = X_{norm} * \cos\theta - Y_{norm} * \sin\theta * \sin\phi - Z_{norm} * \sin\theta * \cos\phi$ $Y_{horizontal} = Y_{norm} * \cos\phi - Z_{norm} * \sin\phi$ wherein $X_{norm}$, $Y_{norm}$, $Z_{norm}$ respectively represent the normalization values of the X, Y, and Z axis fluxgates, $X_{horizontal}$ and $Y_{horizontal}$ respectively represent coordinate transform values of the output values of the X and Y axis fluxgates, $\theta$ represents the pitch angle, and $\phi$ represents the roll angle.

18. The method as claimed in claim 16, wherein the integer transform operation is performed using the following equation:

$X_{new} = (X_{horizontal} * X_{scale}) + X_{offset}$ $Y_{new} = (Y_{horizontal} * Y_{scale}) + Y_{offset}$ wherein $X_{new}$ and $Y_{new}$ respectively represent resultant values of the integer transform operation, $X_{horizontal}$ and $Y_{horizontal}$ respectively represent coordinate transform values of the output values of the X and Y fluxgates, $X_{offset}$ and $Y_{offset}$ respectively represent previously set offset values for the X and Y axis fluxgates, and $X_{scale}$ and $Y_{scale}$ respectively represent previously set scale values for the X and Y axis fluxgates.

19. The method as claimed in claim 16, wherein the normalization factor computing operation is performed by computing an intersection point between concentric circles around resultant values of the integer transform operation and determining X and Y coordinates of the intersection point as offset values of the X and Y fluxgates.

20. The method as claimed in claim 15, wherein computing new normalization factors for the Z axis fluxgate comprises:

computing a plurality of data sets including the normalization values of the X and Y axis fluxgates output from the geomagnetic sensor module while the geomagnetic sensor is swung around the Y axis fluxgate within the previously set range, the output values of the Z axis fluxgate, the pitch angle, and the roll angle;

computing a plurality of normalization values of the Z axis fluxgate using a basic azimuth previously sensed in a horizontal direction and the plurality of data sets; and computing scale and offset values of the Z axis using the normalization values of the Z axis and the output values of the Z axis fluxgate.

21. The method as claimed in claim 20, wherein the normalization values of the Z axis fluxgate are computed by substituting the basic azimuth previously sensed in the horizontal direction and values stored in the data sets in the following equation:

$$Z_{norm} = \frac{(\cos\phi + \tan\psi_s \sin\theta \sin\phi) Y_{norm} - (\tan\psi_s \cos\theta) X_{norm}}{\sin\phi - \sin\theta \cos\phi \tan\psi_s}$$

wherein $\psi_s$ represents the basic azimuth, $\theta$ represents the pitch angle, $\phi$ represents the roll angle, and $X_{norm}$ and $Y_{norm}$ respectively represent the normalization values of the X and Y axis fluxgates included in each of the data sets.

22. The method as claimed in claim 20, wherein the offset and scale values of the Z axis fluxgate are computed by computing a solution of a plurality of simultaneous equations obtained by substituting the normalization values of the Z axis fluxgate and the output values of the Z axis fluxgate for a following equation:

$Z_{offset} + Z_{scale} * Z_{norm} = Z_{raw}$ wherein $Z_{offset}$ represents the offset values of the Z axis fluxgate, $Z_{scale}$ represents the scale values of the Z axis fluxgate, $Z_{raw}$ represents the output values of the Z axis fluxgate included in each of the data sets, and $Z_{norm}$ represents the normalization values of the Z axis fluxgate computed through the second operation.

23. The method as claimed in claim 20, wherein computing new normalization factors for the Z axis fluxgate comprises computing an average value of the scale values of the Z axis and an average value of the offset values of the Z axis to determine the computed average values as final scale and offset values of the Z axis fluxgate if a plurality of scale and offset values of the Z axis are computed.

24. The method as claimed in claim 13, wherein computing the azimuth comprises substituting the renormalized output values and the pitch and roll angles in a state that the geomagnetic sensor is fixedly set for the following equation:

$$\psi = \tan^{-1}\left(\frac{Y_{norm} * \cos\phi - Z_{norm} * \sin\phi}{X_{norm} * \cos\theta - Y_{norm} * \sin\theta * \sin\phi - Z_{norm} * \sin\theta * \cos\phi}\right)$$

wherein $\psi$ represents the azimuth, $X_{norm}$, $Y_{norm}$, and $Z_{norm}$ respectively represent the renormalization values of the X, Y, and Z axis fluxgates, $\theta$ represents the pitch angle, and $\phi$ represents the roll angle.

* * * * *